United States Patent
Hamberg et al.

(10) Patent No.: US 8,240,642 B2
(45) Date of Patent: Aug. 14, 2012

(54) FLUID DAMPER WITH INTERNAL COMPRESSION SPRING

(75) Inventors: James P. Hamberg, Tipp City, OH (US); Michael W. Hurtt, Waynesville, OH (US)

(73) Assignee: BWI Company Limited S.A., Luxembourg (LU)

( * ) Notice: Subject to any disclaimer, the term of this patent is extended or adjusted under 35 U.S.C. 154(b) by 288 days.

(21) Appl. No.: 12/704,683

(22) Filed: Feb. 12, 2010

(65) Prior Publication Data

US 2011/0198787 A1   Aug. 18, 2011

(51) Int. Cl.
    *F16F 9/53* (2006.01)
(52) U.S. Cl. ............. 267/64.11; 188/267.2; 188/322.22
(58) Field of Classification Search ............. 188/267.2, 188/282.9, 317, 322.15, 322.22; 267/64.11, 267/64.12, 120, 123, 124; 280/124.15
    See application file for complete search history.

(56) References Cited

U.S. PATENT DOCUMENTS

| | | | |
|---|---|---|---|
| 3,388,883 A * | 6/1968 | Wossner et al. | 248/188.2 |
| 3,647,239 A * | 3/1972 | Katsumori | 280/124.154 |
| 4,838,393 A * | 6/1989 | Mourray et al. | 188/284 |
| 5,275,389 A | 1/1994 | Pinch et al. | |
| 5,810,130 A | 9/1998 | McCandless | |
| 6,234,461 B1 | 5/2001 | Bohm et al. | |
| 6,318,523 B1 | 11/2001 | Moradmand et al. | |
| 6,814,193 B2 | 11/2004 | Grundei | |
| 7,021,435 B2 | 4/2006 | Lisenker et al. | |
| 7,559,542 B2 | 7/2009 | Cotter | |
| 2003/0015382 A1 | 1/2003 | Lun | |
| 2007/0193839 A1* | 8/2007 | Nakajima et al. | 188/267.2 |
| 2007/0209892 A1* | 9/2007 | Masamura | 188/266 |
| 2009/0107779 A1* | 4/2009 | Azekatsu et al. | 188/267.2 |

OTHER PUBLICATIONS

The Structural Difference Between Mono-tube and Twin-tube. http://www.tein.co.jp/e/special/nitoryu/tigai.html, last accessed Nov. 20, 2009.

* cited by examiner

*Primary Examiner* — Christopher Schwartz
(74) *Attorney, Agent, or Firm* — Dickinson Wright PLLC

(57) ABSTRACT

A monotube shock absorber assembly includes a housing (20), a gas cup (32) slidably disposed in the interior (28) of the housing (20), and a piston (42) slidably disposed in the interior (28) of the housing (20) to define an oil compression chamber (48) between the piston (42) and the gas cup (32). A cushion (58) engages one of the piston (42) and the gas cup (32) and extends axially into the oil compression chamber (48) for intermittent contact with the other of the piston (42) and the gas cup (32). The cushion (58) is a resilient material and deforms in response to the cushion (58) contacting the other of the piston (42) and the gas cup (32). In a preferred embodiment, the cushion (58) defines a central opening (60) for decreasing the axial stiffness of the cushion (58) and engages the gas cup (32) for intermittent contact with the piston (42). In a preferred embodiment the cushion (58) presents an anchor (72) for retaining the cushion (58) against the piston (42) for intermittent contact with the gas cup (32).

17 Claims, 4 Drawing Sheets

FLUID DAMPER WITH INTERNAL COMPRESSION SPRING

BACKGROUND OF THE INVENTION

1. Field of the Invention

A structure for a thrust member of a monotube shock absorber assembly including oil and gas for absorbing forces between a first component and a second component

2. Description of the Prior Art

Monotube shock absorbers are well known in the prior art. The U.S. Patent Application Publication 2003/0015382 to Lun discloses a housing extending along an axis from a first housing end to a second housing end and having an inner wall presenting an interior. A gas cup is slidably disposed in the interior of the housing for sliding along the axis. The gas cup has a first gas cup end facing the first housing end of the housing to define a gas chamber between the first gas cup end and the first housing end. The gas cup has a second gas cup end opposite the first gas cup end. A piston extends between a compression face and a return face and is slidably disposed in the interior of the housing for sliding along the axis. The piston defines an oil compression chamber between the compression face and the inner wall of the housing and the second gas cup end and defines an oil return chamber between the return face and the inner wall of the housing. A piston rod engages the piston and extends through the oil return chamber and through the second housing end.

SUMMARY OF THE INVENTION

The invention provides for a cushion engaging one of the piston and the second gas cup end and extending axially into the oil compression chamber for intermittent contact with the other of the piston and the second gas cup end.

ADVANTAGES OF THE INVENTION

The invention generates progressive rate build-up during the axial travel of the piston within the piston housing.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
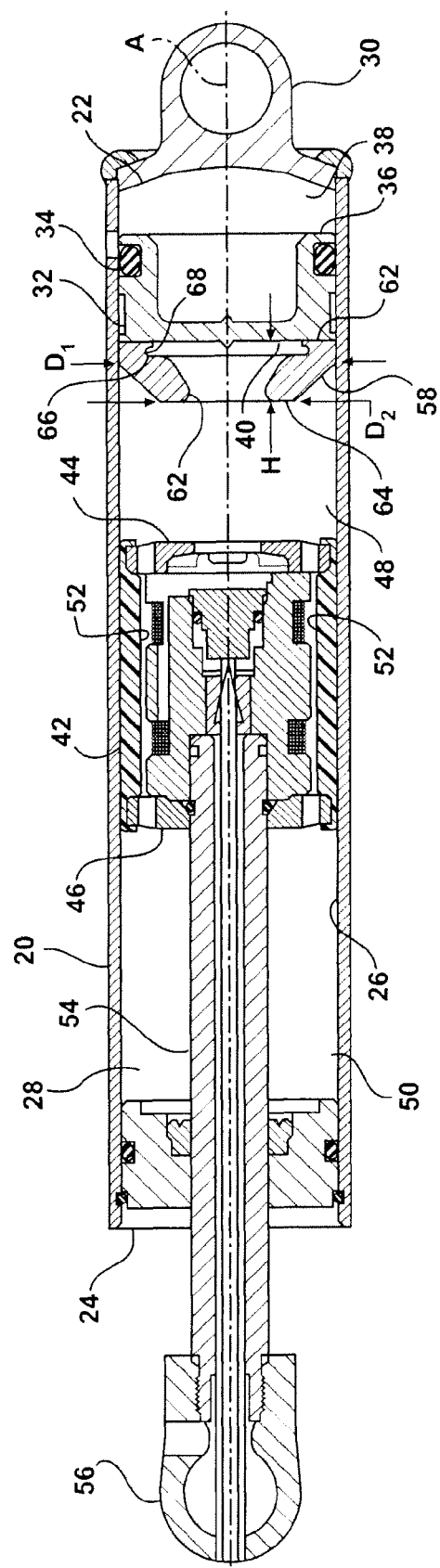
FIG. 1 is sectional view of a monotube shock absorber assembly in accordance with an embodiment of the subject invention.
Figure 2:
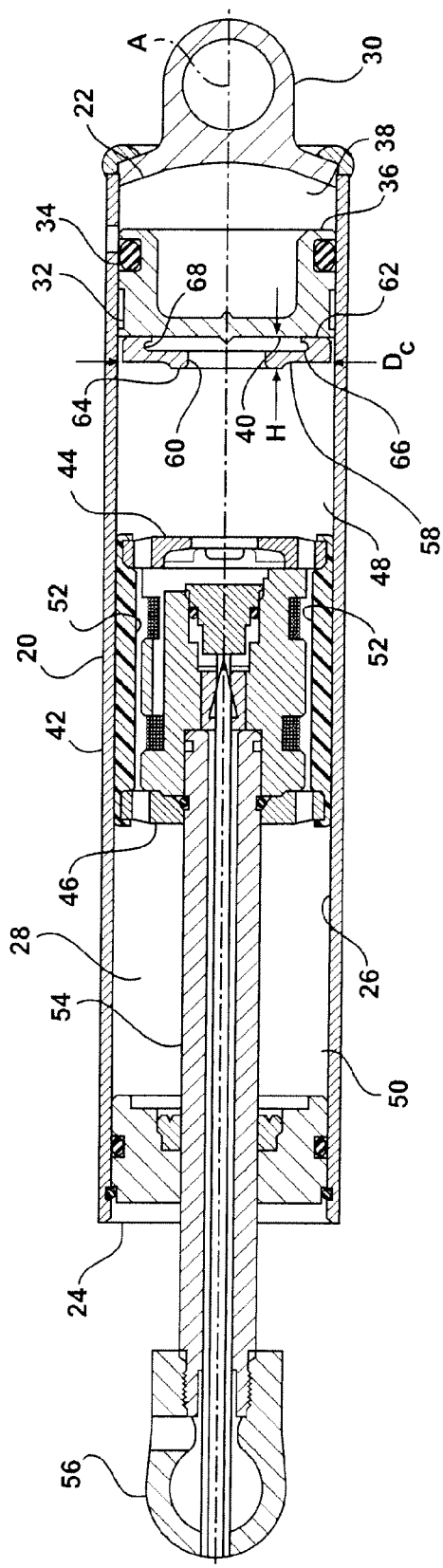
FIG. 2 is sectional view of a monotube shock absorber assembly in accordance with an embodiment of the subject invention.
Figure 3:
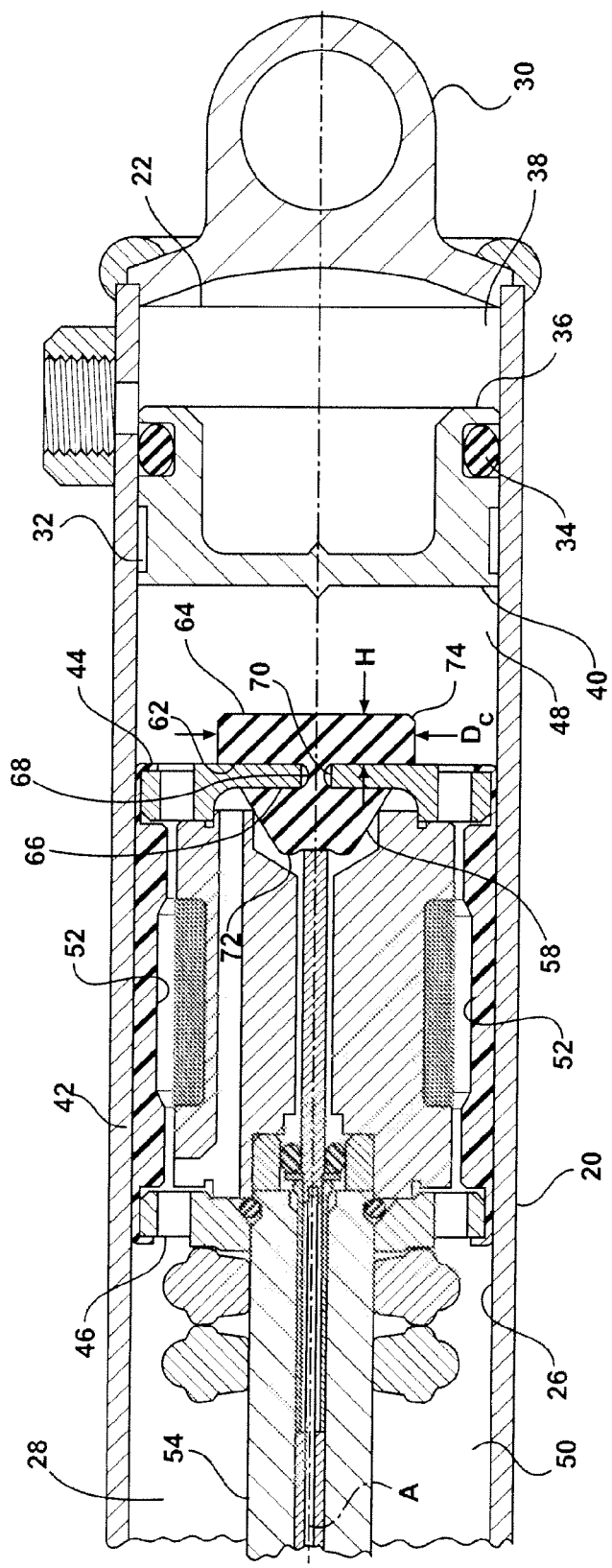
FIG. 3 is sectional view of a monotube shock absorber assembly in accordance with an embodiment of the subject invention.
Figure 4:
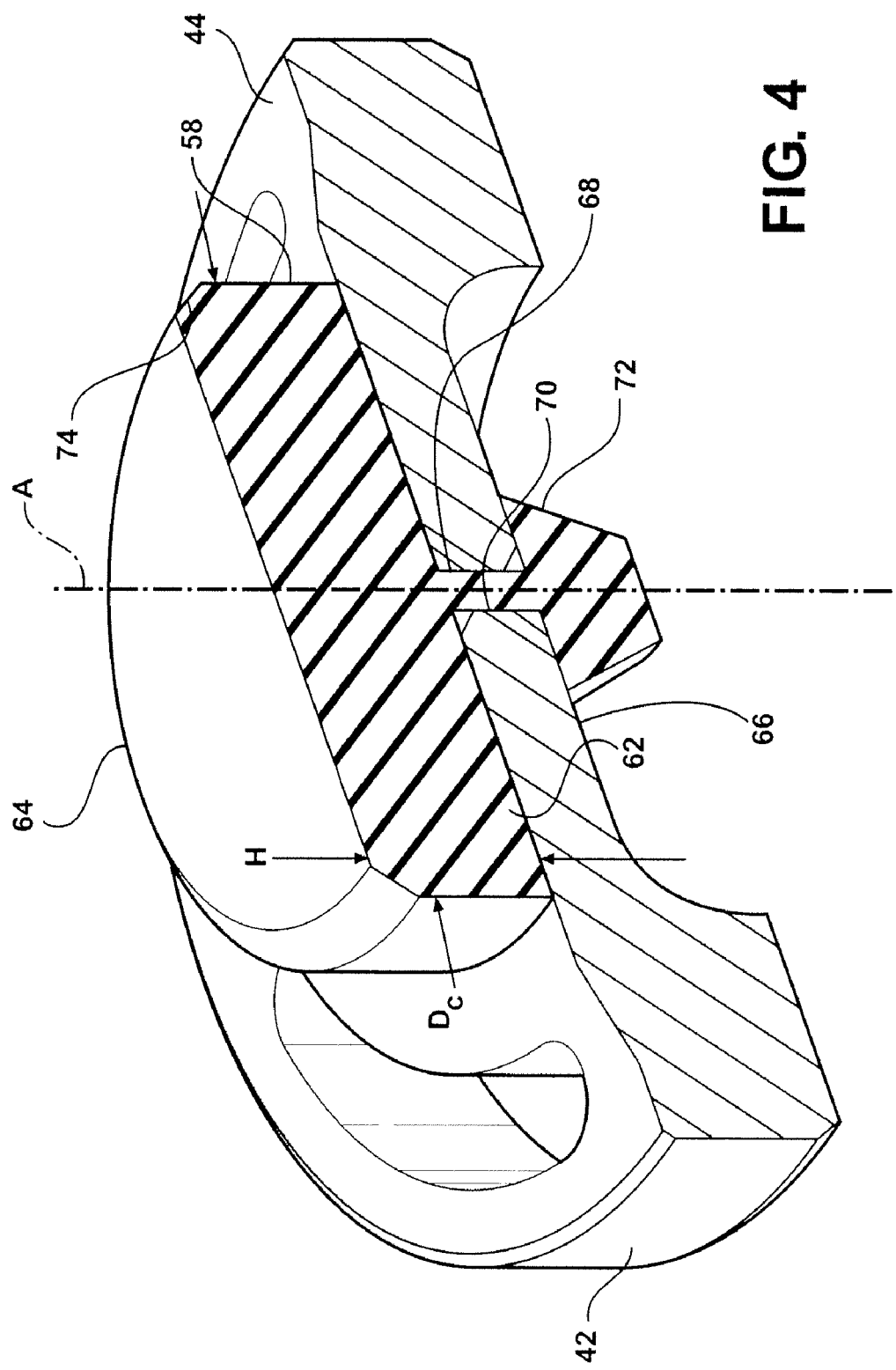
FIG. 4 is a sectional view of a cushion and a portion of a piston in accordance with an embodiment of the subject invention.

Referring to the Figures, wherein like numerals indicate corresponding parts throughout the several views, a monotube shock absorber assembly including oil and gas for absorbing forces between a first component and a second component and includes a casing or a housing 20. The housing 20 has a cylindrical shape and extends along an axis A from a first housing cap or end 22 to a second housing cap or end 24 and has an inner wall 26 presenting an interior 28. A first connector 30 is disposed on the first housing end 22 for attachment to the first component.

A gas cup 32 is slidably disposed in the interior 28 of the housing 20 for sliding along the axis A. A ring or seal 34 seals the gas cup 32 to the inner wall 26 of the housing 20. The gas cup 32 has a first gas cup end 36 facing the first housing end 22 of the housing 20 and defines a gas chamber 38 between the first gas cup end 36 and the first housing end 22 for retaining the gas therein. A second gas cup end 40 is opposite the first gas cup end 36.

A piston 42 extends between a compression side or face 44 facing the second gas cup end 40 and a return side or face 46 opposite the compression face 44. The piston 42 is slidably disposed in the interior 28 of the housing 20 for sliding along the axis A. The piston 42 defines an oil compression chamber 48 between the compression face 44 and the inner wall 26 of the housing 20 and the second gas cup end 40 of the gas cup 32. The piston 42 defines an oil return chamber 50 between the return face 46 and the inner wall 26 of the housing 20. The piston 42 defines a plurality of apertures 52 for conveying the oil through the piston 42 and between the oil compression chamber 48 and the oil return chamber 50. A piston rod 54 engages the piston 42 and extends along the axis A, through the oil return chamber 50 and through the second housing end 24 to a second connector 56. The second connector 56 is for attachment to the second component.

The invention includes a bumper or cushion 58 engaging one of the piston 42 and the second gas cup end 40 and extending axially into the oil compression chamber 48 for intermittent contact with the other of the piston 42 and the second gas cap end 40. The cushion 58 is for cushioning movement in response to the cushion 58 contacting the other of the piston 42 and the second gas cup end 40.

In an enabling embodiment, the cushion 58 is annular to define a central opening 60 for decreasing the stiffness of the cushion 58. The cushion 58 presents a first cushion end 62 engaging the second gas cup end 40 and extends axially to a second cushion end 64. The second cushion end 64 receives intermittent contact with the piston 42. The second gas cup end 40 of the gas cup 32 presents a retaining flange 66 extending radially outwardly towards the inner wall 26 of the housing 20. The cushion 58 defines a slot or channel 68 for interconnecting the cushion 58 and the gas cup 32 and the channel 68 engaging and retaining the flange 66 of the second gas cup end 40.

The cushion 58 has a conical shape. The first cushion end 62 has a first outside diameter $D_1$ and the second cushion end 64 has a second outside diameter $D_2$ smaller than the first outside diameter $D_1$. The cushion 58 defines a cushion height H between the first cushion end 62 and the second cushion end 64. The cushion height H is approximately 25% of the first outside diameter $D_1$.

In an alternative embodiment, the cushion 58 defines a cushion diameter $D_C$ $D_C$ and defines a cushion height H between the first cushion end 62 and the second cushion end 64. The cushion height H increases from the central opening 60 60 to 15% of the cushion diameter $D_C$ $D_C$ adjacent the central opening 60. From there, the cushion height H decreases to 12% of the cushion diameter $D_C$ $D_C$ in a direction radially outward toward the inner wall 26 of the housing 20. Adjacent the inner wall 26, the cushion height H is 12% of the cushion diameter $D_C$ $D_C$.

In another embodiment, the piston 42 includes the retaining flange 66 and defines a throat 70 through the compression face 44 along the axis A. The cushion 58 defines a cushion diameter $D_C$ perpendicular to the axis A. The first cushion end 62 has an anchor 72 extending axially and centrally therefrom. The anchor 72 is Christmas-tree shaped and passes through the throat 70 for retaining the cushion 58 against the piston 42. The cushion 58 extends axially from the first cushion end 62 to a second cushion end 64 that is opposite the first cushion end 62. The second cushion end 64 is for receiving an impact with the gas cup 32. The cushion 58 defines a cushion height H between the first cushion end 62 and the second cushion end 64. The cushion height H is about 25% of the cushion diameter $D_C$. The cushion 58 defines a chamfer 74 extending circumferentially about the second cushion end 64.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

ELEMENT LIST

| Element Symbol | Element Name |
|---|---|
| 20 | housing |
| 22 | first housing end |
| 24 | second housing end |
| 26 | inner wall |
| 28 | interior |
| 30 | first connector |
| 32 | gas cup |
| 34 | seal |
| 36 | first gas cup end |
| 38 | gas chamber |
| 40 | second gas cup end |
| 42 | piston |
| 44 | compression face |
| 46 | return face |
| 48 | oil compression chamber |
| 50 | oil return chamber |
| 52 | apertures |
| 54 | piston rod |
| 56 | second connector |
| 58 | cushion |
| 60 | central opening |
| 62 | first cushion end |
| 64 | second cushion end |
| 66 | flange |
| 68 | channel |
| 70 | throat |
| 72 | anchor |
| 74 | chamfer |
| A | axis |
| $D_1$ | first outside diameter |
| $D_2$ | second outside diameter |
| $D_C$ | cushion diameter |
| H | cushion height |

What is claimed is:

1. A monotube shock absorber assembly including oil and gas for absorbing forces between a first component and a second component, comprising;
    a housing (20) extending along an axis (A) from a first housing end (22) to a second housing end (24) and having an inner wall (26) presenting an interior (28),
    a gas cup (32) slidably disposed in said interior (28) of said housing (20) for sliding along said axis (A) and having a first gas cup end (36) facing said first housing end (22) of said housing (20) to define a gas chamber (38) between said first gas cup end (36) and said first housing end (22) and having a second gas cup end (40) opposite said first gas cup end (36),
    a piston (42) extending between a compression face (44) and a return face (46) and slidably disposed in said interior (28) of said housing (20) for sliding along said axis (A) and defining an oil compression chamber (48) between said compression face (44) and said inner wall (26) of said housing (20) and said second gas cup end (40) and defining an oil return chamber (50) between said return face (46) and said inner wall (26) of said housing (20),
    a piston rod (54) engaging said piston (42) and extending said through said oil return chamber (50) and through said second housing end (24),
    a cushion (58) engaging one of said piston (42) and said second gas cup end (40) and extending axially into said oil compression chamber (48) for intermittent contact with the other of said piston (42) and said second gas cup end (40) and includes a resilient material for elastic deformation in response to contact with the other of said piston (42) and said second gas cup end (40); and
    said cushion defining a slot (68) and one of said piston (42) and said gas cap (32) including a retaining flange (66) for interconnecting said cushion (58) and one of said piston (42) and said gas cap (32).

2. A monotube shock absorber as set forth in claim 1 wherein said second gas cup end (40) of said gas cup (32) presents said retaining flange (66) extending radially outwardly towards said inner wall (26) of said housing (20).

3. A monotube shock absorber as set forth in claim 1 wherein said cushion (58) presents a first cushion end (62) engaging said second gas cup end (40) and extending axially to a second cushion end (64) for receiving intermittent contact with said piston (42).

4. A monotube shock absorber as set forth in claim 3 wherein said cushion (58) is annular to define a central opening (60).

5. A monotube shock absorber as set forth in claim 4 wherein said first cushion end (62) has a first outside diameter ($D_1$) and said second cushion end (64) has a second outside diameter ($D_2$) smaller than said first outside diameter ($D_1$) to define a conical shape of said cushion (58) and said cushion (58) defines a cushion height (H) between said first cushion end (62) and said second cushion end (64) and said cushion height (H) being 25% of said first outside diameter ($D_1$).

6. A monotube shock absorber as set forth in claim 4 wherein said cushion (58) defines a cushion diameter ($D_C$) perpendicular to said axis (A) and said cushion (58) defines a cushion height (H) between said first cushion end (62) and said second cushion end (64) and said cushion height (H) increases from said central opening (60) to 15% of said first outside diameter ($D_1$) adjacent said central opening (60) and decreasing to 12% in a direction radially outward toward said inner wall (26) of said housing (20) and said cushion height (H) being 12% of said first outside diameter ($D_1$) being adjacent said inner wall (26).

7. A monotube shock absorber as set forth in claim 1 wherein said piston (42) includes said retainer flange (66) and defines a throat (70) through said compression face (44) along said axis (A) and said cushion (58) presents a first cushion end (62) having an anchor (72) extending axially and centrally therefrom and being Christmas-tree shaped and passing through said throat (70) for retaining said cushion (58) against said piston (42).

8. A monotube shock absorber as set forth in claim 7 wherein said cushion (58) defines a cushion diameter ($D_C$) perpendicular to said axis (A) and extends axially from said first cushion end (62) to a second cushion end (64) opposite said first cushion end (62) for receiving an impact with said gas cup (32) and said cushion (58) defines a cushion height (H) between said first cushion end (62) and said second cushion end (64) and said cushion height (H) being 25% of the second outside diameter ($D_2$) and said cushion (58) defines a chamfer (74) extending circumferentially about said second cushion end (64).

9. A monotube shock absorber as set forth in claim 1 wherein said piston (42) defines a plurality of apertures (52) for conveying the oil through said piston (42) and between said oil compression chamber (48) and said oil return chamber (50).

10. A monotube shock absorber as set forth in claim 1 wherein said gas cup (32) includes a seal (34) for sealing said gas cup (32) to said inner wall (26) of said housing (20).

11. A monotube shock absorber as set forth in claim 1 including a first connector (30) disposed on said first housing end (22) for attachment to the first component.

12. A monotube shock absorber as set forth in claim 1 wherein said piston rod (54) extends along said axis (A) to a second connector (56) for attachment to the second component.

13. A monotube shock absorber assembly including oil and gas for absorbing forces between a first component and a second component, comprising;
 a housing (20) having a cylindrical shape and extending along an axis (A) from a first housing end (22) to a second housing end (24) and having an inner wall (26) presenting an interior (28),
 a first connector (30) disposed on said first housing end (22) for attachment to the first component,
 a gas cup (32) slidably disposed in said interior (28) of said housing (20) for sliding along said axis (A) and including a seal (34) for sealing said gas cup (32) to said inner wall (26) of said housing (20) and having a first gas cup end (36) facing said first housing end (22) of said housing (20) to define a gas chamber (38) between said first gas cup end (36) and said first housing end (22) of said housing (20) for retaining the gas therein and having a second gas cup end (40) opposite said first gas cup end (36),
 a piston (42) extending between a compression face (44) and a return face (46) and slidably disposed in said interior (28) of said housing (20) for sliding along said axis (A) and defining an oil compression chamber (48) between said compression face (44) and said inner wall (26) of said housing (20) and said second gas cup end (40) and defining an oil return chamber (50) between said return face (46) and said inner wall (26) of said housing (20) and defining a plurality of apertures (52) for conveying the oil through said piston (42) and between said oil compression chamber (48) and said oil return chamber (50),
 a piston rod (54) engaging said piston (42) and extending along said axis (A) said through said oil return chamber (50) and through said second housing end (24) to a second connector (56) for attachment to the second component,
 a cushion (58) engaging one of said piston (42) and said second gas cup end (40) and extending axially into said oil compression chamber (48) for intermittent contact with the other of said piston (42) and said second gas cup end (40) and being a resilient material for elastically deforming in response to said cushion (58) contacting the other of said piston (42) and said gas cup (32) second end and;
 said cushion defining a slot (68) and one of said piston (42) and said gas cap (32) including a retaining flange (66) for interconnecting said cushion (58) and one of said piston (42) and said gas cap (32).

14. The assembly as set forth in claim 13 wherein said second gas cup end (40) of said gas cup (32) includes said retaining flange (66) extending radially outwardly towards said inner wall (26) of said housing (20) and said cushion (58) is annular to define a central opening (60) and presents a first cushion end (62) engaging said second gas cup end (40) and extending axially to a second cushion end (64) for receiving intermittent contact with said piston (42).

15. The assembly as set forth in claim 14 wherein said first cushion end (62) has a first outside diameter ($D_1$) and said second cushion end (64) has a second outside diameter ($D_2$) smaller than said first outside diameter ($D_1$) to define a conical shape of said cushion and said cushion (58) defines a cushion height (H) between said first cushion end (62) and said second cushion end (64) and said cushion height (H) being 25% of said first outside diameter ($D_1$).

16. The assembly as set forth in claim 14 wherein said cushion (58) defines a cushion diameter ($D_C$) perpendicular to said axis (A) and defines a cushion height (H) between said first cushion end (62) and said second cushion end (64) and said cushion height (H) increases from said central opening (60) to 15% of said first outside diameter ($D_1$) adjacent said central opening (60) and decreases to 12% in a direction radially outward toward said inner wall (26) of said housing (20) and said cushion height (H) is 12% of said first outside diameter ($D_1$) being adjacent said inner wall (26).

17. The assembly as set forth in claim 13 wherein said piston (42) defines said retaining flange (66) and includes a throat (70) through said compression face (44) along said axis (A) and said cushion (58) defines a cushion diameter ($D_C$) perpendicular to said axis (A) and presents a first cushion end (62) having an anchor (72) extending axially and centrally therefrom and said anchor (72) being Christmas-tree shaped and passing through said throat (70) for retaining said cushion (58) against said piston (42) and said cushion (58) extends axially from said first cushion end (62) to a second cushion end (64) opposite said first cushion end (62) for receiving an impact with said gas cup (32) and said cushion (58) defines a cushion height (H) between said first cushion end (62) and said second cushion end (64) and said cushion height (H) being 25% of the second outside diameter ($D_2$) and said cushion (58) defines a chamfer (74) extending circumferentially about said second cushion end (64).

* * * * *